United States Patent [19]

Inokuchi et al.

[11] Patent Number: 5,658,103
[45] Date of Patent: Aug. 19, 1997

[54] BORING BIT

[75] Inventors: Mitsuhide Inokuchi; Shunji Chiba; Atsushi Otogawa, all of Nagoya, Japan

[73] Assignee: Mitsuhide Inokuchi, Aichi-ken, Japan

[21] Appl. No.: 593,054

[22] Filed: Jan. 29, 1996

[30] Foreign Application Priority Data

Jan. 27, 1995 [JP] Japan .................. 7-011773

[51] Int. Cl.⁶ .................................. B23B 51/00
[52] U.S. Cl. .................. 408/145; 408/156; 408/199; 408/222; 15/104.09
[58] Field of Search ............... 407/8; 408/145, 408/156, 153, 199, 227, 221, 222, 223, 224; 15/104.09, 104.95, 104.14

[56] References Cited

U.S. PATENT DOCUMENTS

| 450,323 | 4/1891 | Tomlinson | 408/714 |
| 1,685,380 | 9/1928 | Shultz | 15/104.09 |
| 3,278,964 | 10/1966 | Horelica | 15/104.09 X |
| 5,158,405 | 10/1992 | Serafin | 408/145 X |
| 5,297,905 | 3/1994 | Schmidt et al. | 408/145 |
| 5,322,398 | 6/1994 | Schmidt et al. | 408/145 |

FOREIGN PATENT DOCUMENTS 272266  8/1970  U.S.S.R. .................. 15/104.09

*Primary Examiner*—Daniel W. Howell
*Assistant Examiner*—Henry W. H. Tsai
*Attorney, Agent, or Firm*—Dennison, Meserole, Pollack & Scheiner

[57] ABSTRACT

A boring bit includes a shank adapted to be mounted on a rotary tool. A blade is mounted on the shank and is resiliently deformable to reduce its boring diameter.

10 Claims, 4 Drawing Sheets

BORING BIT

BACKGROUND OF THE INVENTION

1. Field of the Invention

The present invention relates to a boring bit, and particularly to a boring bit which is adapted to be mounted on a rotary tool and which is suitable to bore a semi-rigid and relatively fragile material such as a foam plastic.

2. Description of the Prior Art

Conventionally, when a communication cable, etc. is underlaid, a sealer such as expandable resin is used for supporting the communication cable within a cable duct and for preventing rats or water from entering the cable duct. For this reason, in order to extend the communication cable or to change the same to a new one, it is necessary to remove a semi-rigid and relatively fragile wall made of expandable resin. Normally, as shown in FIG. 9, to remove a wall W made of an expandable resin-based sealer, a chisel-like tool 41 is driven into the wall W in a direction parallel to a longitudinal direction of a cable C so as to bore and break the wall W. In FIG. 9, numeral 42 designates a hammer, numeral 41a designates a through-hole through which a driver (not shown) is inserted to rotate or prize the tool 41, and alphabet U designates a pad made of urethane, etc. and stuffed for defining a space into which the expandable resin-based sealer is injected. In FIG. 9, a pad on the side of an end opening has been previously removed by a telephone and radio plier or the like. Alternatively, a drill or a fret saw has been used for boring and breaking the wall W.

However, with the conventional measure, the operation for boring and removing the wall must be performed manually by a number of operation steps. In addition, a surface coating covering the cable may be accidentally damaged during the boring operation, resulting in that the cable is cut. The possibility of damage on the cable is particularly increased when the drill or the fret saw is used.

SUMMARY OF THE INVENTION

It is, accordingly, an object of the present invention to provide a boring bit which is used with a rotary tool and which is operable to easily and rapidly bore and remove a material such as a sealer made of expandable resin.

It is another object of the present invention to provide a boring bit which is improved in safety and which does not cause substantial damage on a cable even if a blade of the bit contacts a surface coating of the cable.

According to the present invention, there is provided a boring bit comprising:

- a shank adapted to be mounted on a rotary tool; and
- a blade mounted on the shank and resiliently deformable to reduce its boring diameter.
- When the boring bit is mounted on the rotary tool and is adapted for boring a construction made of semi-rigid and fragile materials such as foam plastic, and when the blade contacts an obstacle such as a cable embedded into the construction or an operational force to press the blade toward the construction has become excessive, the blade is resiliently deformed to reduce its boring diameter in response to the boring resistance produced at that time.

Preferably, the blade includes a plurality of blade members made of wires, so that the blade having a desired resiliency can be easily obtained.

An abutting member may be provided for contacting an inner wall of a hole bored by the blade, so that the boring bit cannot be moved further when the blade has been resiliently deformed to have a boring diameter smaller than the diameter of the abutting member.

A second blade may be provided for efficiently enlarging the bore formed by the above blade. In this connection, an adjustor member may be provided for suitably adjusting the boring diameter of the second blade in response to the condition of the construction to be bored.

By determining the section of the wires to have a circular configuration, the blade may not cause substantial damage on the cable even if the blade contacts a surface coating of the cable.

The invention will become more fully apparent from the claims and the description as it proceeds in connection with the drawings.

DETAILED DESCRIPTION OF THE PREFERRED EMBODIMENT

Various embodiments of the present invention will now be explained with reference to the accompanying drawings.

Figure 1:
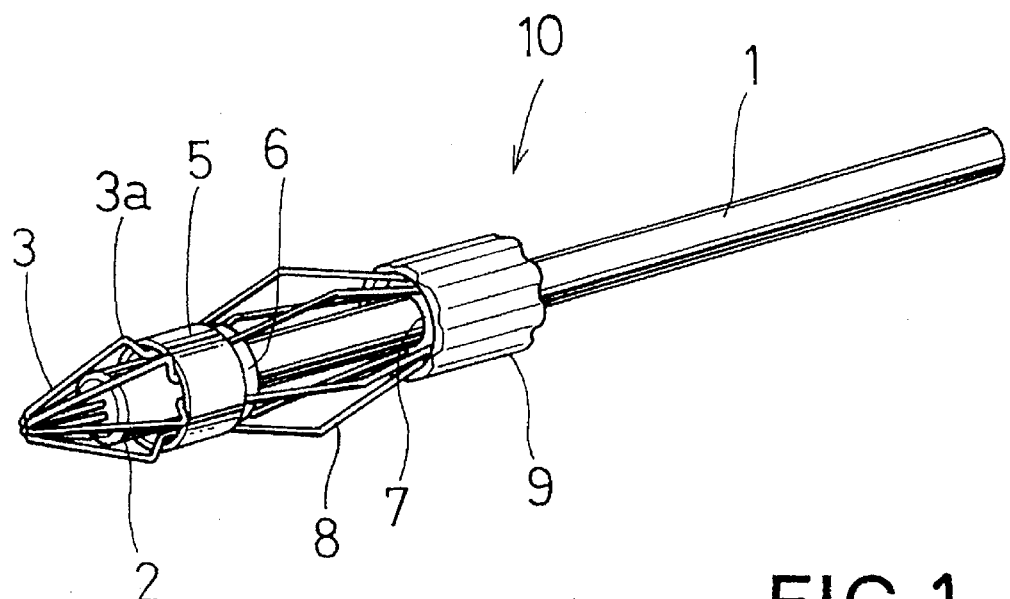
FIG. 1 is a perspective view of a boring bit according to a first embodiment of the present invention.
Figure 2:
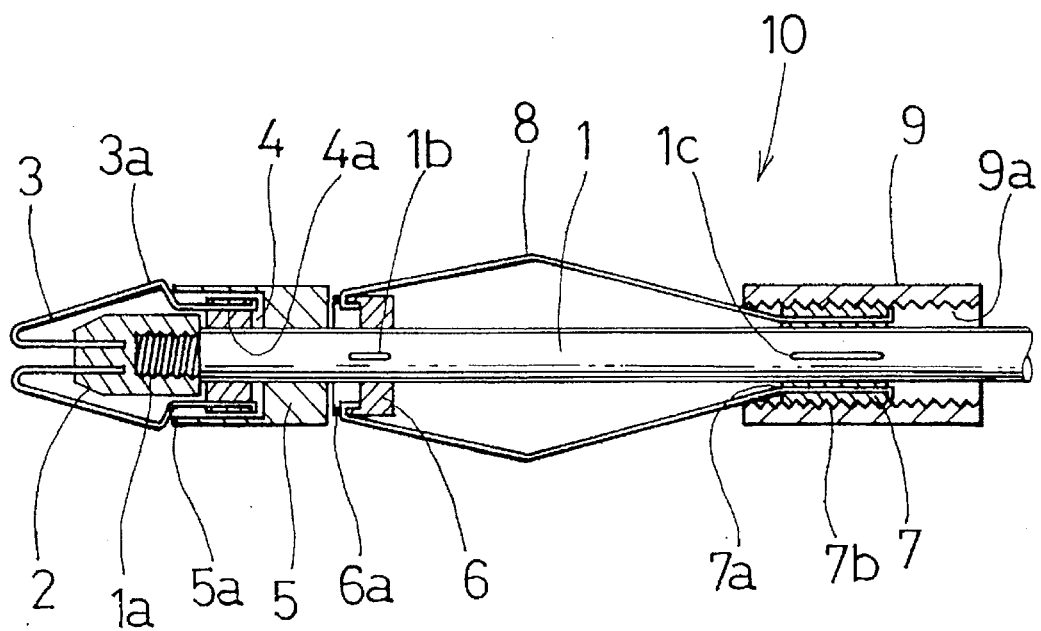
FIG. 2 is a side sectional view of the boring bit.

Referring to FIGS. 1 and 2, there is shown a boring bit 10 according to a first embodiment of the present invention. The boring bit 10 includes a bar-like shank 1 which has a male thread portion 1a formed on its front end and which has key grooves 1b and 1c formed in its middle portion. A cap 2 is threadably engaged with the male thread portion 1a. A plurality of blade members 3 (six in this embodiment) made of wires such as music wires or steel wires are fixed to the cap 2. Each of the blade members 3 has one end fixedly embedded into the cap 2 and has the other end mounted on a support ring 4. One end of each blade member 3 extends forwardly from the cap 2 and is then bent rearwardly and radially outwardly. Each blade member 3 is bent at its middle portion so as to form a lateral projection 3a which is directed radially outwardly of the shank 1. The support ring 4 is rotatably mounted on the shank 1 and has a plurality of axial through-holes 4a. The other end of each of the blade members 3 is passed through its corresponding through-hole 4a and is bent radially outwardly, so that the other end is prevented from removal from the through-hole 4a. Although, in this embodiment, each of the blade members 3 is circular in section, the blade members 3 may be polygonal in section. The material and the diameter of the blade members 3 may be suitably selected according to the material to be bored.

With this construction, when a pressing force is applied to the blade members 3 in a direction radially inwardly while the shank 1 is rotated, the blade members 3 are resiliently deformed and the support ring 4 is rotated relative to the shank 1 as the blade members 3 are thus deformed. Therefore, the blade members 3 are twisted around the shank 1, so that the outer diameter of the whole blade members 3 is reduced.

A cylindrical abutting member 5 is rotatably mounted on the shank 1 and receives the support ring 4 therewithin. The abutting member 5 has an outer diameter smaller than a boring diameter or a maximum outer diameter of the whole blade members 3 (the diameter at the lateral projections 3a). A front end 5a of the abutting member 5 is positioned adjacent the lateral projections 3a of the blade members 3. Here, the abutting member 5 is held between the support ring 4 and a front fixed ring 6 which will be explained later, so that the axial movement of the abutting member 5 is limited to a slight distance.

A rear fixed ring 7 as well as the front fixed ring 6 is fitted on the middle portion of the shank 1 through press fitting or shrinkage fitting. The front fixed ring 6 and the rear fixed ring 7 is prevented from rotation by keys (not shown) which are inserted into the key grooves 1b and 1c, respectively. A plurality of second blade members 8 (six in this embodiment) made of wires such as music wires or steel wires are disposed between the front fixed ring 6 and the rear fixed ring 7. Each of the second blade members 8 is bent at the middle portion to form a lateral projection which is directed radially outwardly of the shank 1, so that each second blade member 8 has a bow-like configuration. The front fixed ring 6 has mounting holes 6a formed therein. Each of the mounting holes 6a extends in a radial direction for receiving and holding one end of the corresponding second blade member 8. The rear fixed ring 7 has mounting holes 7a formed therein and extending in the axial direction for receiving and holding the other end of the corresponding second blade member 8. An adjustor ring 9 has a female thread 9a which is in engagement with a male thread 7b formed on an outer periphery of the rear fixed ring 7. With this construction, when the adjustor ring 9 is rotated to be moved forwardly, the second blade members 8 are pressed inwardly by the adjustor ring 9, so that a boring diameter or a maximum diameter of the whole second blade members 8 (the diameter at the lateral projections) is reduced. When the adjustor ring 9 is moved rearwardly, the boring diameter of the whole second blade members 8 is increased.

The operation of the boring bit of the above embodiment will now be explained.

Figure 3:
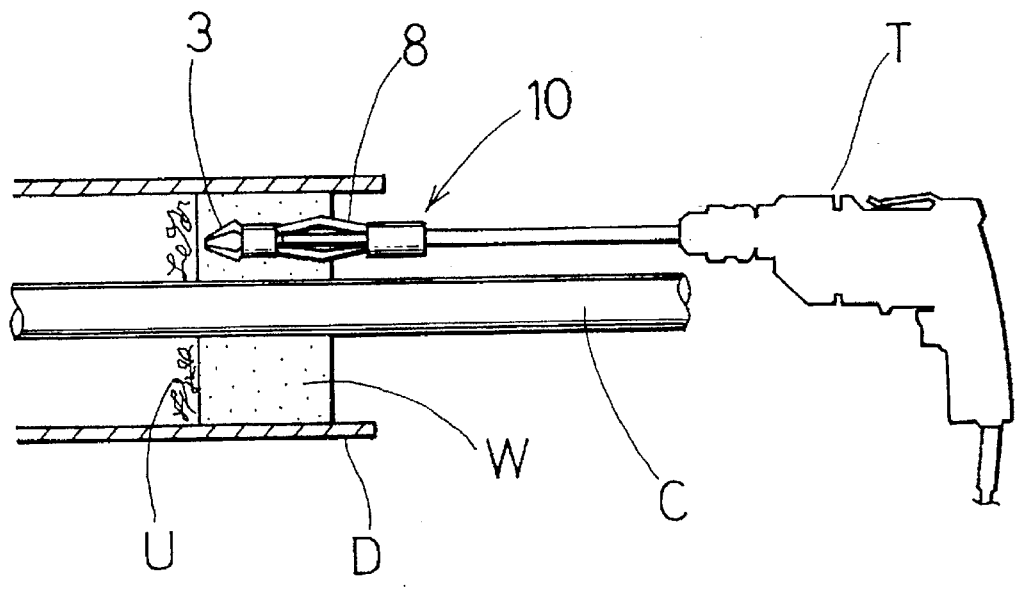
FIG. 3 is an explanatory view showing the operation of the boring bit.

FIG. 3 shows a communication cable C which is inserted into a cable duct D. The communication cable C is supported by a wall W which is formed by a sealer made of expandable resin in a position adjacent an opening of one end of the cable duct D. In order to remove the wall W, the boring bit 10 is mounted on a spindle of a rotary tool T and is pressed onto the wall W so as to bore and break the wall W. Although, a power driven rotary tool is used as the rotary tool T in this embodiment, a manually driven rotary tool may be used as the rotary tool T. In FIG. 3, a pad U made of urethane, etc. is stuffed for defining a space into which the expandable resin-based sealer is injected. In FIG. 3, a pad on the side of the opening of the cable duct D has been previously removed by a telephone and radio plier or the like.

Figure 4:
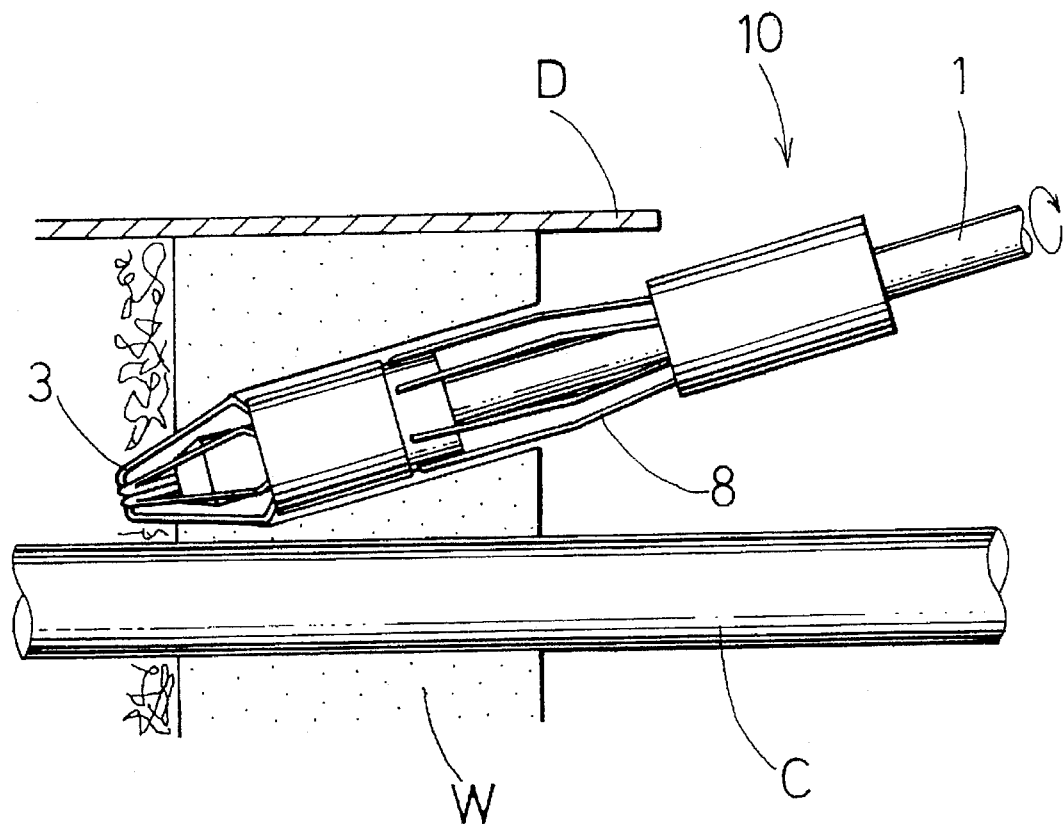
FIG. 4 is an explanatory view showing a different operation of the boring bit.

In the boring operation, an operator adjusts the pressing force of the boring bit 10 onto the wall W in response to the condition and the rigidness of the wall W. When the wall W is relatively soft and is easily broken, the operator operates the adjustor ring 9 such that the boring diameter of the whole second blade members 8 is adjusted to correspond to the diameter of a hole to be bored as shown in FIG. 3, so that the boring operation can be efficiently performed. When the wall W is rigid, the adjustor ring 9 is operated to reduce the boring diameter of the whole second blade members 8 to a diameter smaller than the boring diameter of the whole first blade members 3 as shown in FIG. 4, so that the boring operation is performed only by the action of the first blade members 3.

Figure 5:
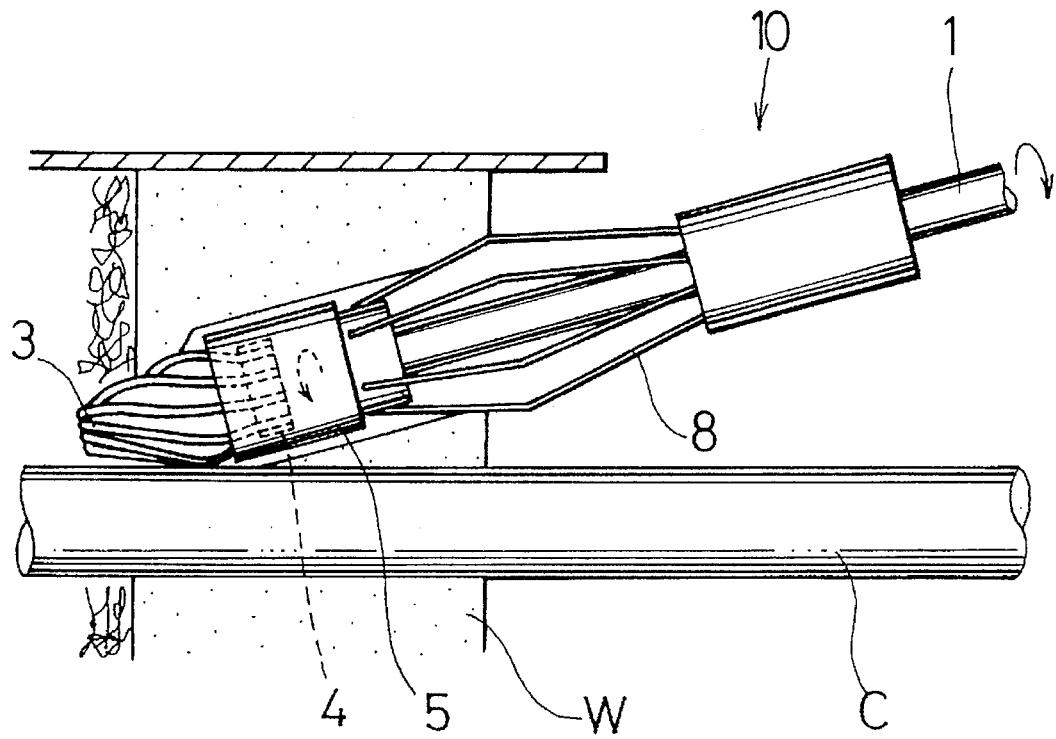
FIG. 5 is an explanatory view showing a further different operation of the boring bit.

When the first blade members 3 contact the communication cable C during the boring operation while the amount of interference of the communication cable C with the first blade members 3 are relatively small as shown in FIG. 5, the first blade members 3 may not break an outer coating of the communication cable C but slide on the outer coating. Thus, the first blade members 3 contacting the communication cable C are resiliently deformed, so that the first blade members 3 dodge the communication cable C one after another. Since the first blade members 3 are made of wires which are circular in section, the communication cable C may not be damaged and the friction heat may be reduced.

The above operation may be also applied to the second blade members 8.

Figure 6:
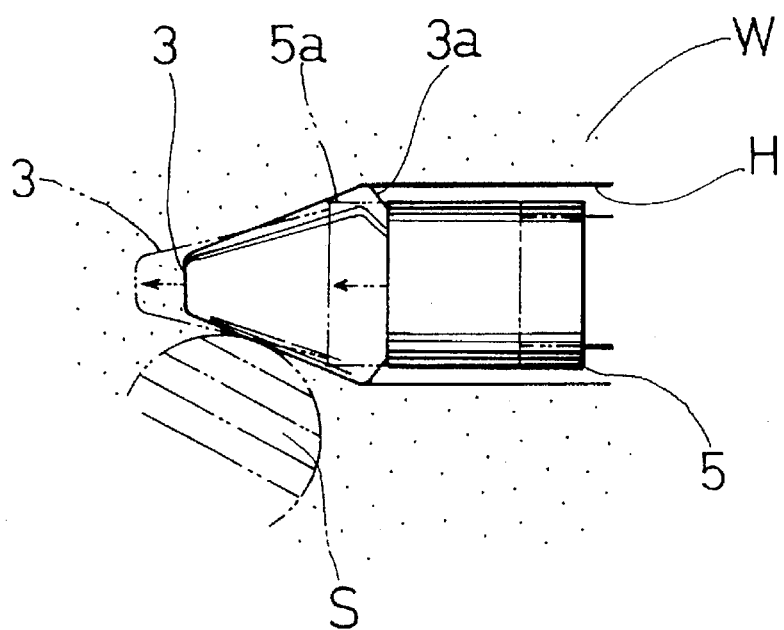
FIG. 6 is an explanatory view showing the operation of an abutting member of the boring bit.

When the amount of interference of an obstacle S (including the communication cable or other objects within the wall W) with the first blade members 3 is relatively great as shown in FIG. 6, or when the pressing force applied by the operator to the boring bit 10 is too excessive, the first blade members 3 are deformed to reduce their boring diameter at the lateral projections 3a to be smaller than the outer diameter of the abutting member 5 as shown in FIG. 6. When the pressing force is further applied to the shank 1, the front portion of the boring bit 10 may further move forwardly to some extent as indicated by chain lines in FIG. 5. However, the shank 1 cannot move further when the front end 5a of the abutting member 5 abuts on a peripheral wall of a hole H which has been bored. Therefore, the boring speed is limited to a predetermined speed even if the boring bit 10 has been operated by different operators. In addition, if the obstacle S is the communication cable, the damage on the communication cable can be avoided. Further, since the abutting member 5 is free to rotate relative to the shank 1, no excessive friction heat is produced.

Figure 7:
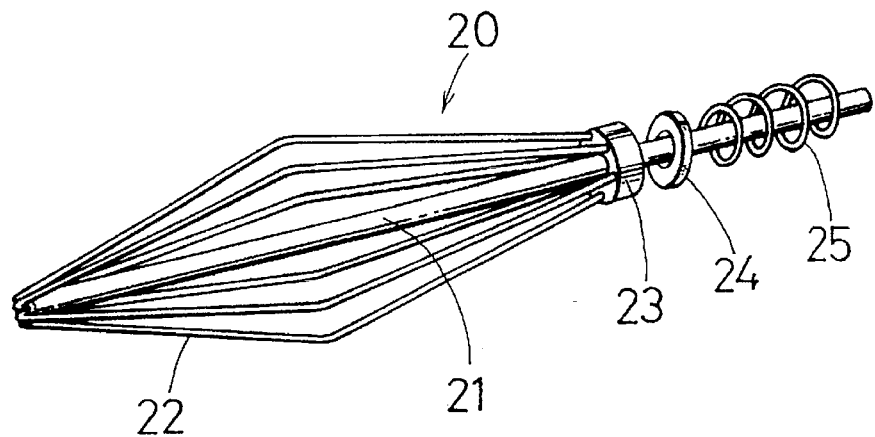
FIG. 7 is a perspective view of a boring bit according to a second embodiment of the present invention.

A second embodiment of the present invention will now be explained with reference to FIG. 7.

A boring bit 20 of the second embodiment includes a shank 21 and a plurality of blade members 22 made of music wires or steel wires each having one end fixed to the front end of the shank 21. Each of the blade members 22 is bent at the middle portion to form a lateral projection which is directed radially outwardly of the shank 21, so that the blade member 22 has a bow-like configuration. The other end of each of the blade members 22 is fixed to a support ring 23 which is rotatably and axially slidably mounted on the middle portion of the shank 21. A washer 24 and a coil spring 25 are slidably fitted on the shank 21 and are positioned rearwardly of the support ring 23. When the shank 21 is clamped by a chuck (not shown) of the rotary tool T, the coil spring 25 is compressed between the chuck and the washer 24 which is in abutment on the support ring 23, so that the biasing force is produced by the coil spring 25 to vary the boring diameter of the whole blade members 22 at their lateral projections.

With this embodiment, the blade members 22 can be resiliently deformed to vary their boring diameter in response to the boring resistance applied to the blade members 22 during the boring operation. Therefore, even if the blade members 22 have been interfered by the communication cable, etc. during the boring operation, the blade members 22 receive no excessive load and do not cause substantial damage on the communication cable, etc. Particularly, in this embodiment, the adjustment of the boring diameter of the blade members 22 can be made by varying the clamping position of the chuck or by selecting the coil spring 25 to have a suitable biasing force. Otherwise, the coil spring 25 may be eliminated.

Figure 8:
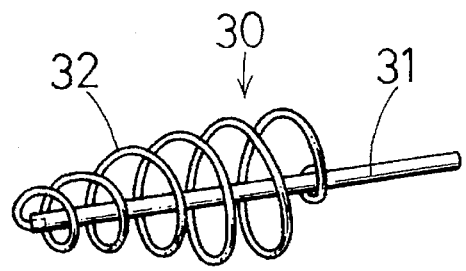
FIG. 8 is a perspective view of a boring bit according to a third embodiment of the present invention.
Figure 9:
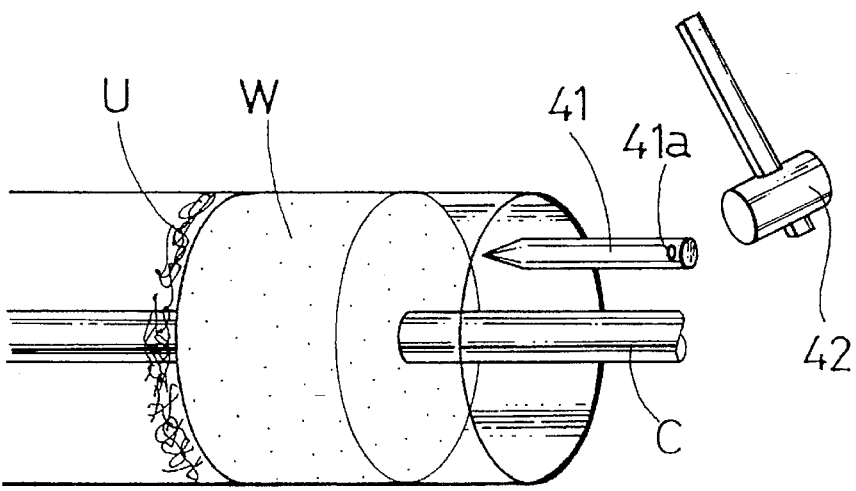
FIG. 9 is an explanatory view showing the operation of a conventional boring bit.

A third embodiment of the present invention will now be explained with reference to FIG. 8. A boring bit 30 of this embodiment includes a shank 31 and a blade member 32. The blade member 32 is made of a conical spring having a diameter increasing in a rearward direction of the shank 31. The blade member 32 has one end fixed to the front end of the shank 31. The other end of the blade member 32 is coiled around the middle portion of the shank 31, so that the other end is rotatable and slidable relative to the shank 31. Thus, the boring bit 30 of this embodiment is simple in construction and is suitable to bore and break a construction made of a material which is relatively soft and fragile. During the boring operation, the diameter of the blade member 32 of this embodiment varies with the boring resistance. When the blade member 32 contacts the obstacle, the blade member 32 may be deformed such that its central axis is displaced from the axis of the shank 31.

While the invention has been described with reference to preferred embodiments, it is to be understood that modifications or variation may be easily made without departing from the spirit of this invention which is defined by the appended claims.

What is claimed is:

1. A boring bit comprising:
   a shank having a front end, said shank being adapted to mount on a rotary tool;
   a blade mounted on said shank and defining a predetermined boring diameter, said blade being resiliently deformable to reduce said boring diameter;
   said blade including a plurality of blade members, each blade member being of wire and having one end fixed to said front end of said shank, each wire blade member extending forwardly from said front end of said shank and, from a point forward of said front end of said shank, extending rearward to define a middle portion overlying said shank rearward of said front end and laterally outward of said shank, each wire blade member having a second end beyond said middle portion rotatably supported by said shank for rotation in a circumferential direction relative to said shank.

2. A boring bit comprising:
   a shank adapted to mount to a rotary tool, said shank having a forward end;
   a blade mounted on said shank at said forward end, said blade being resiliently deformable in response to boring resistance to define variable boring diameters between a maximum diameter and a minimum diameter; and an abutting member positioned on said shank rearwardly of said blade and having a diameter smaller than said maximum boring diameter of said blade and greater than said minimum diameter wherein said abutting member is operable to abut on an inner wall of a bore formed by said blade during a boring operation to prevent continued movement of the bit in a boring direction when the boring diameter of said blade has become smaller than the diameter of said abutting member through increased resistance within a material to be bored.

3. The boring bit as defined in claim 2 and further including a second blade positioned rearwardly of said abutting member and extending laterally outwardly of said shank, said second blade being operable to enlarge the bore formed by said blade.

4. The boring bit as defined in claim 3 wherein said second blade includes a plurality of second blade members made of wires and each bent to project laterally outwardly of said shank, and wherein adjustor means is provided for adjusting a boring diameter of said second blade.

5. The boring bit as defined in claim 2 wherein said blade has a diameter increasing in a rearward direction wherein the inner wall of a bore formed by said blade during a boring operation has a substantially conical configuration.

6. A boring bit particularly adapted for boring into a semi-rigid and relatively fragile material, said bit comprising:
   a shank mountable on a rotary tool, said shank having a forward end, a blade mounted on said shank at said forward end, said blade being resiliently deformable and selectively contractible in response to the encountering of resistance in the forming of a bore beyond that defined by the nature of the fragile material, said blade selectively contracting from a maximum boring diameter, and means positioned on said shank rearward of said blade for abutting engagement with an inner wall of a bore being formed by the bit upon contraction of said blade to at least a predetermined diameter less than said maximum boring diameter to restrict further penetration of the bit.

7. A boring bit comprising:
   a shank having a front end, said shank being mountable on a rotary tool for rotational driving thereof, a plurality of wire blade members, each blade member having one end fixed to said front end of said shank and a second end rotatably mounted on said shank rearward of said front end for relative rotation between said blade member second end and said shank, said blade members, beyond said fixed one ends thereof, extending forwardly beyond said front end of said shank and terminating in intermediate rearwardly extending portions which in turn terminate in said second ends.

8. The boring bit of claim 7 wherein said wire blade members are rotatable about said shank relative to said fixed one ends thereof for selective contraction of said blade members from a maximum boring diameter toward said shank upon engagement with a predetermined resistance.

9. The boring bit of claim 8 including abutment means rotatably mounted on said shank rearward of said intermediate portions of said blade members for precluding forward boring movement of said bit responsive to contraction of said wire blade members to a predetermined diameter less than the maximum diameter of said blade members, wherein boring movement of said bit will be restrained, said abutment means engaging an inner surface of a bore being defined by said boring bit.

10. The boring bit of claim 9 including a second plurality of wire blade members positioned rearwardly of said abutment means and longitudinally along said shank, said second wire blade members having fixed forward ends and fixed rear ends, said second wire blade members defining a boring diameter about said shank, and means for varying the boring diameter of said second wire blade members.

* * * * *